United States Patent
Kim

(10) Patent No.: US 11,698,271 B2
(45) Date of Patent: Jul. 11, 2023

(54) APPARATUS AND METHOD FOR UPDATING MAP INFORMATION FOR VEHICLE

(71) Applicants: Hyundai Motor Company, Seoul (KR); Kia Corporation, Seoul (KR)

(72) Inventor: Chi Hwan Kim, Gyeonggi-do (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 0 days.

(21) Appl. No.: 17/512,308

(22) Filed: Oct. 27, 2021

(65) Prior Publication Data

US 2022/0228883 A1 Jul. 21, 2022

(30) Foreign Application Priority Data

Jan. 21, 2021 (KR) .................. 10-2021-0008547

(51) Int. Cl.
*G01C 21/00* (2006.01)
*G01C 21/32* (2006.01)

(52) U.S. Cl.
CPC ......... *G01C 21/3815* (2020.08); *G01C 21/32* (2013.01); *G01C 21/387* (2020.08); *G01C 21/3848* (2020.08)

(58) Field of Classification Search
None
See application file for complete search history.

(56) References Cited

U.S. PATENT DOCUMENTS

| 2014/0350777 | A1* | 11/2014 | Kawai | G07C 5/0808 |
| | | | | 701/32.3 |
| 2020/0226927 | A1* | 7/2020 | Iwasaki | B60W 10/18 |
| 2021/0039671 | A1* | 2/2021 | Kim | G01C 21/3822 |

FOREIGN PATENT DOCUMENTS

| CN | 105206073 A | * | 12/2015 |
| JP | 2010008068 A | * | 1/2010 |
| JP | 2017117186 A | * | 6/2017 |
| JP | 2018132529 A | * | 8/2018 |
| KR | 102035030 B1 | | 10/2019 |

OTHER PUBLICATIONS

Machine translation of JP-2017117186-A (Year: 2017).*
Machine translation of JP-2010008068-A (Year: 2010).*
Machine translation of JP-2018132529-A (Year: 2018).*
Machine translation of CN-105206073-A (Year: 2015).*

* cited by examiner

*Primary Examiner* — Anne Marie Antonucci
*Assistant Examiner* — Kyle S Park
(74) *Attorney, Agent, or Firm* — Fox Rothschild LLP

(57) ABSTRACT

An apparatus for updating map information for a vehicle includes a vehicle information detecting device that detects information of a surrounding vehicle which accompanies a vehicle, when the vehicle travels through an intersection, a line analyzing device that analyzes line information based on information of the surrounding vehicle which accompanies the vehicle, a reliability determining device that determines reliability of the line information, and a controller that extracts a change point on a map based on the reliability and update map information based on the change point.

18 Claims, 9 Drawing Sheets

APPARATUS AND METHOD FOR UPDATING MAP INFORMATION FOR VEHICLE

CROSS-REFERENCE TO RELATED APPLICATION

This application claims under 35 U.S.C. § 119(a) the benefit of Korean Patent Application No. 10-2021-0008547, filed in the Korean Intellectual Property Office on Jan. 21, 2021, the entire contents of which are incorporated herein by reference.

BACKGROUND

(a) Technical Field

The present disclosure relates to an apparatus and a method for updating map information for a vehicle.

(b) Description of the Related Art

In general, a map system partially synthesizes an image captured by a person while he or she wanders around a particular area or an image captured by a mobile mapping system (MMS) having a location aware system (LAS) or an imaging device into an overall map image to provide the overall map image.

However, it is inconvenient for individuals to capture images while separately wandering for map collection, i.e., for updating map information. Due to this, it is impossible to frequently update map images in an efficient manner.

Furthermore, using a high-priced MMS to construct a map may be cost-prohibitive.

SUMMARY

An aspect of the present disclosure provides an apparatus and a method for updating map information to extract a change point of a map based on driving information collected from a general vehicle or an autonomous vehicle and update line information of the map to provide an accurate map and update map information at low cost without using a high-priced mobile mapping system (MMS).

Another aspect of the present disclosure provides an apparatus and a method for updating map information to reflect changes of the intersection entry line in map information in real time to increase convenience of a driver.

The technical problems to be solved by the present disclosure are not limited to the aforementioned problems, and any other technical problems not mentioned herein will be clearly understood from the following description by those skilled in the art to which the present disclosure pertains.

According to an aspect of the present disclosure, an apparatus for updating map information may include a vehicle information detecting device that detects information of a surrounding vehicle which accompanies a vehicle, when the vehicle travels through an intersection, a line analyzing device that analyzes line information based on the information of the surrounding vehicle which accompanies the vehicle, a reliability determining device that determines reliability of the line information, and a controller that extracts a change point on a map based on the reliability and updates map information based on the change point.

The vehicle information detecting device may collect information of the surrounding vehicle (i.e., at least one surrounding vehicle) recognized from at least one sensor provided in the vehicle, when the vehicle enters the intersection.

The information of the surrounding vehicle may include ID information of the surrounding vehicle recognized by a camera of the vehicle.

The vehicle information detecting device may detect the information of the surrounding vehicle which accompanies the vehicle among the collected information of the surrounding vehicle, when the vehicle travels through the intersection.

The vehicle information detecting device may match the vehicle on the map based on position information collected from the vehicle and may identify an intersection entry or driving state based on information of the map on which the vehicle is matched.

The line analyzing device may obtain intersection entry line information based on the number of surrounding vehicles which accompany the vehicle.

The line analyzing device may analyze whether the obtained intersection entry line information is identical to intersection entry line information on the map.

The controller may extract the change point based on a point where the obtained intersection entry line information and the intersection entry line information on the map are not identical to each other on the map, when the obtained intersection entry line information is not identical to the intersection entry line information on the map.

The controller may update line information about the change point of the map, based on the obtained intersection entry line information.

The reliability determining device may obtain traffic congestion information based on a density of the surrounding vehicle and may determine the reliability of the line information based on the traffic congestion information.

According to another aspect of the present disclosure, a method for updating map information may include detecting information of a surrounding vehicle which accompanies a vehicle, when the vehicle travels through an intersection, analyzing line information based on the information of the surrounding vehicle which accompanies the vehicle, determining reliability of the line information, and extracting a change point on a map based on the reliability and updating map information based on the change point.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
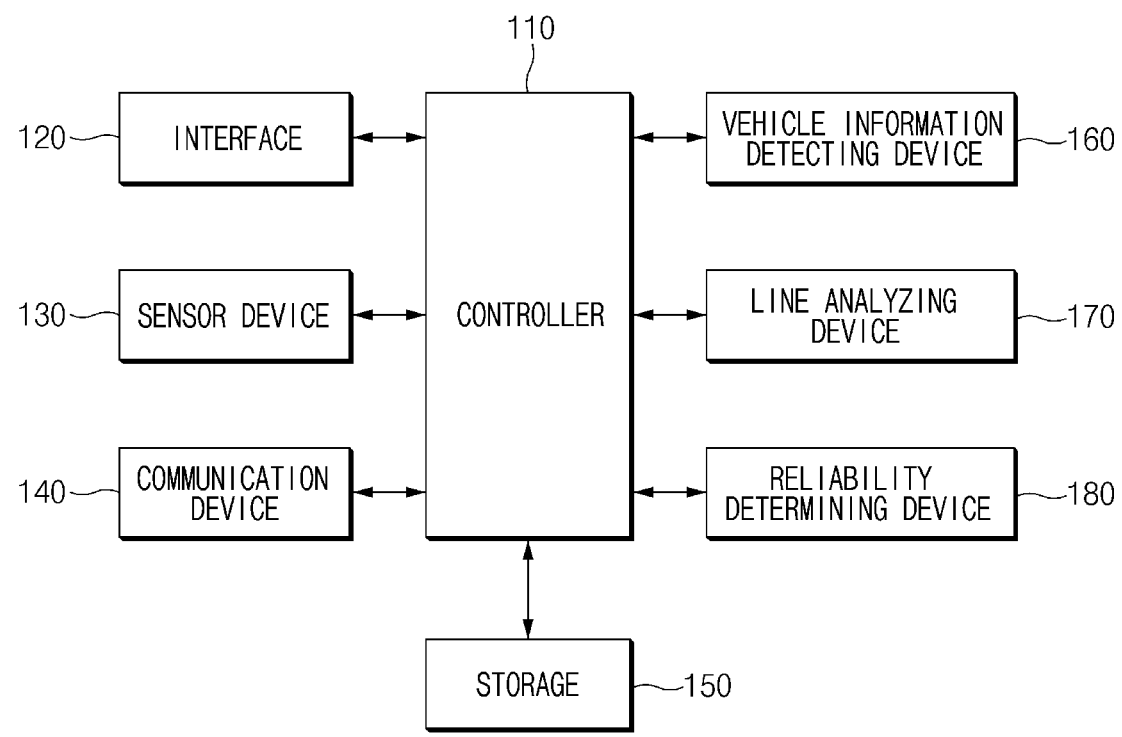
FIG. 1 is a block diagram illustrating a configuration of an apparatus for updating map information according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, some embodiments of the present disclosure will be described in detail with reference to the exemplary drawings. In adding the reference numerals to the components of each drawing, it should be noted that the identical or equivalent component is designated by the identical numeral even when they are displayed on other drawings. Further, in describing the embodiment of the present disclosure, a detailed description of well-known features or functions will be ruled out in order not to unnecessarily obscure the gist of the present disclosure.

In describing the components of the embodiment according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an apparatus for updating map information according to an embodiment of the present disclosure.

Referring to FIG. 1, the apparatus for updating the map information according to an embodiment of the present disclosure may include a controller 110, an interface 120, a sensor device 130, a communication device 140, a storage 150, a vehicle information detecting device 160, a line analyzing device 170, and a reliability determining device 180. Herein, the controller 110, the vehicle information detecting device 160, the line analyzing device 170, and the reliability determining device 180 of the apparatus for updating the map information according to an embodiment of the present disclosure may be implemented as at least one processor.

The interface 120 may include an input device for receiving a control command from a user and an output device for outputting an operation state, an operation result, or the like of the apparatus for updating the map information.

Herein, the input device may include a key button and may include a soft key implemented on a display. Furthermore, the input device may include a mouse, a joystick, a jog shuttle, a stylus pen, or the like.

The output device may include a display and may include a voice output device such as a speaker. As an example, the display may display map information and may display vehicle information matched on a map. Furthermore, the display may display updated map information.

In this case, when a touch sensor such as a touch film, a touch sheet, or a touch pad is provided in the display, the display may operate as a touchscreen and may be implemented in a form where the input device and the output device are integrated with each other.

In this case, the display may include at least one of a liquid crystal display (LCD), a thin film transistor-LCD (TFT-LCD), an organic light-emitting diode (OLED) display, a flexible display, a field emission display (FED), or a three-dimensional (3D) display.

The sensor device 130 may include a sensor for detecting information of at least one surrounding vehicle located around the vehicle.

As an example, the sensor may include a camera for recognizing a vehicle shape from an image obtained around the vehicle and detecting information (e.g., a vehicle ID or the like) of the surrounding vehicle. Herein, the camera may be an advanced driver assistance system (ADAS)-based camera.

Of course, the sensor may include another type of sensor for detecting information of the surrounding vehicle other than the camera.

The communication device 140 may include a communication module for vehicle network communication with electronics and/or controllers provided in the vehicle.

As an example, the communication module may receive vehicle information detected by sensors provided in the vehicle. Furthermore, the communication module may transmit updated map information to a navigation device provided in the vehicle.

Herein, a technology for the vehicle network communication may include controller area network (CAN) communication, local interconnect network (LIN) communication, flex-ray communication, or the like.

Furthermore, the communication device 140 may include a communication module for accessing wireless Internet or a communication module for short range communication.

Herein, a technology for the wireless Internet may include wireless local area network (WLAN), wireless broadband (WiBro), wireless-fidelity (Wi-Fi), world interoperability for microwave access (WiMAX), or the like.

Furthermore, a technology for the short range communication may include Bluetooth, ZigBee, ultra-wideband (UWB), radio frequency identification (RFID), infrared data association (IrDA), or the like.

The storage 150 may store data, an algorithm, and/or the like necessary for an operation of the apparatus for updating the map information.

As an example, the storage 150 may store pieces of information of surrounding vehicle(s), which are collected from at least one sensor provided in the vehicle, and may store information of the surrounding vehicle(s), which is detected by the vehicle information detecting device 160, among the pieces of collected information of the surrounding vehicle(s).

Furthermore, the storage 150 may store a command, an algorithm, and/or the like for detecting information of the surrounding vehicle(s) among pieces of information of the surrounding vehicle(s), analyzing line information, and determining reliability of the line information.

Furthermore, the storage 150 may store map data and may store updated map information.

Herein, the storage 150 may include a storage medium such as a random access memory (RAM), a static RAM (SRAM), a read-only memory (ROM), a programmable ROM (PROM), or an electrically erasable PROM (EEPROM).

The controller 110 may control an operation of each component of the apparatus for updating the map information, while performing a map information update operation, and may process a signal delivered between the respective components.

As an example, the controller 110 may control an operation of the sensor device 130 to collect information of the vehicle.

Thus, the sensor device 130 may detect position information of the vehicle to deliver the detected position information of the vehicle to the controller 110.

The controller 110 may display a map on the display and may match the vehicle on the map displayed on the display based on the position information of the vehicle, which is detected by the sensor device 130.

In this case, the controller 110 may identify a state where the vehicle enters an intersection or a state where the vehicle travels through the intersection, based on vehicle information matched on the map. As an example, the controller 110 may identify a state where the vehicle enters an intersection or a state where the vehicle travels through the intersection, based on an angle of the vehicle, a departure degree of the vehicle on the road where the vehicle is traveling, or the like.

Herein, the state where the vehicle enters the intersection refers to a state where the vehicle is waiting on an intersection entry line for rotational driving before the vehicle travels through the intersection. Furthermore, the state where the vehicle travels through the intersection refers to a state where the vehicle performs rotational driving along the intersection on the intersection entry line.

Figure 2A:
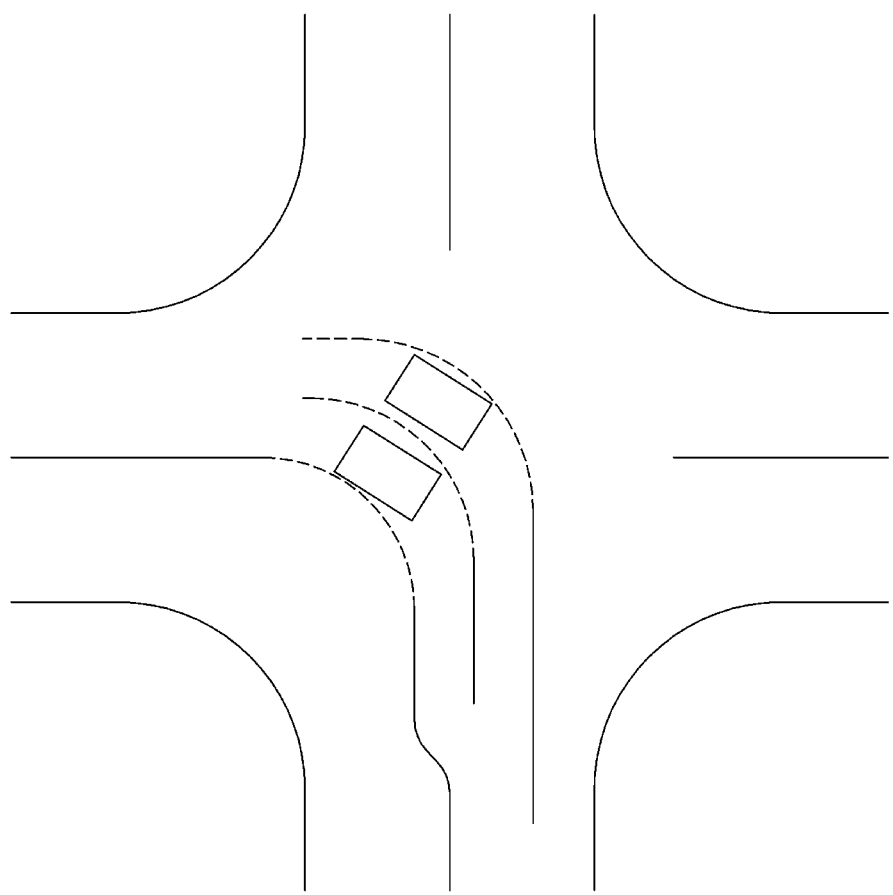
FIGS. 2A, 2B, and 2C are drawings illustrating embodiments referenced to describe an operation of recognizing an intersection in an apparatus for updating map information according to an embodiment of the present disclosure.
Figure 2B:
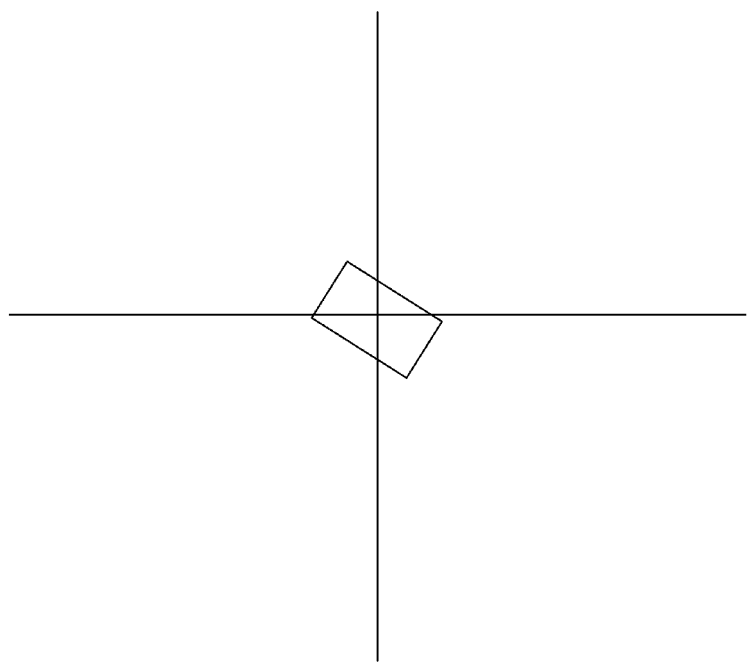
Figure 2C:
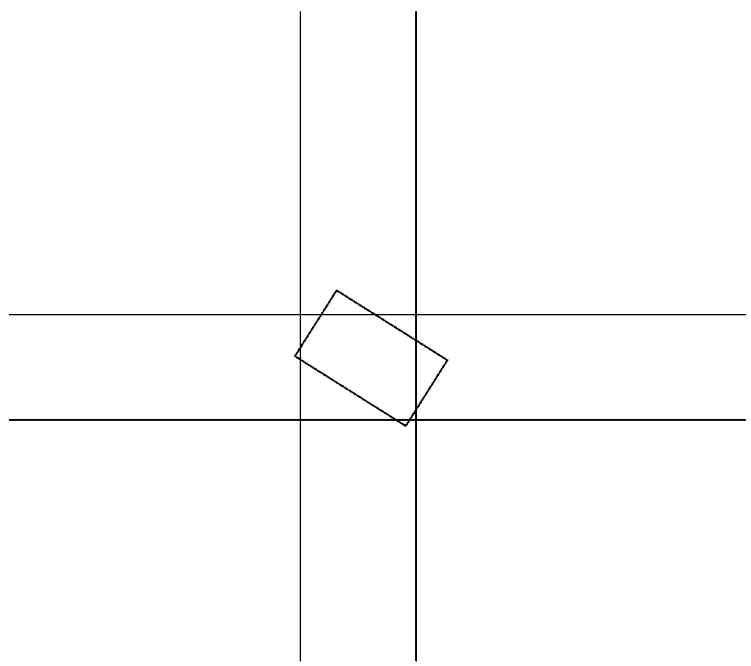

A description will be given of an operation of identifying the state where the vehicle enters the intersection or the state where the vehicle travels through the intersection with reference to embodiments of FIGS. 2A to 2C. FIGS. 2A to 2C are drawings illustrating embodiments referenced to describe an operation of recognizing an intersection in an apparatus for updating map information according to an embodiment of the present disclosure.

First of all, FIG. 2A illustrates an embodiment of matching a vehicle on a general map. As shown in FIG. 2A, when matching a position of the vehicle on a map, a controller 110 of FIG. 1 may determine that the vehicle is located on an intersection and that the vehicle travels through the intersection.

FIG. 2B illustrates an embodiment of matching a vehicle on a map of a link shape.

Furthermore, FIG. 2C illustrates an embodiment of matching a vehicle on a map of a complex intersection shape.

Like FIGS. 2B and 2C, when the vehicle enters an intersection or when the vehicle travels through the intersection, because of a position of the matched vehicle, the vehicle departs from a link of a certain level. Thus, the controller 110 may identify a state where the vehicle enters an intersection or a state where the vehicle travels through the intersection, based on a position of the vehicle matched on the map, a direction of the vehicle, an angle of the vehicle, a departure degree of the vehicle on the road where the vehicle is traveling, or the like.

The state where the vehicle enters the intersection or the state where the vehicle travels through the intersection, the controller 110 may control an operation of a sensor device 130 of FIG. 1 to collect information of a surrounding vehicle.

Thus, the sensor device 130 may detect information of the surrounding vehicle (i.e., at least one surrounding vehicle) located around the vehicle. Herein, the information of the surrounding vehicle may include a vehicle ID.

Figure 3:
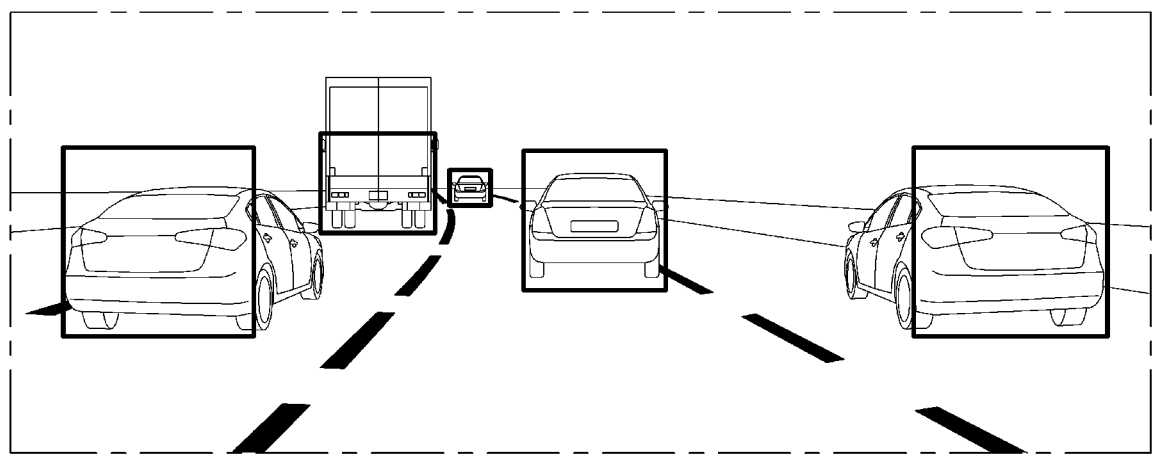
FIG. 3 is a drawing illustrating an embodiment referenced to describe an operation of recognizing a surrounding vehicle in an apparatus for updating map information according to an embodiment of the present disclosure.

A description will be given of the operation of detecting the information of the surrounding vehicle with reference to FIG. 3. FIG. 3 is a drawing illustrating an embodiment referenced to describe an operation of recognizing the surrounding vehicle in an apparatus for updating map information according to an embodiment of the present disclosure.

Referring to FIG. 3, a camera of a sensor device 130 of FIG. 1 may capture an image around the vehicle and may extract a vehicle shape in the captured image by image analysis.

In this case, the camera of the sensor device 130 may recognize each surrounding vehicle from the vehicle shape in the captured image and may detect information of each recognized surrounding vehicle, for example, a vehicle ID of the surrounding vehicle.

The information of the surrounding vehicle detected by the sensor device 130 may be delivered to a vehicle information detecting device 160 of FIG. 1 via a controller 110 of FIG. 1.

The vehicle information detecting device 160 may identify the information of the surrounding vehicle, which is detected by the sensor device 130, in the state where the vehicle enters an intersection. In this case, the vehicle information detecting device 160 may identify a vehicle ID of the surrounding vehicle located at the left/right of the vehicle.

When the state where the vehicle travels through the intersection is identified, the vehicle information detecting device 160 may identify information of a surrounding vehicle which accompanies the vehicle among surrounding vehicles detected by the sensor device 130.

Herein, the surrounding vehicle which accompanies the vehicle refers to a surrounding vehicle which travels through an intersection in the same direction as the vehicle among surrounding vehicles located around the vehicle, that is, at the left/right of the vehicle, when the vehicle is waiting on an intersection entry line.

Thus, a line analyzing device 170 of FIG. 1 may analyze line information based on information of the surrounding vehicle which accompanies the vehicle. Herein, the line analyzing device 170 may obtain intersection entry line information based on the number of surrounding vehicles which accompany the vehicle.

As an example, when the number of all lines is 5 and when the vehicle travels through an intersection on the first lane, the line analyzing device 170 may analyze that the intersection entry lines are 2 lines and that the other three lines are general driving lines, when the number of surrounding vehicles which accompany the vehicle is one at the right when traveling through the intersection.

In this case, the line analyzing device 170 may analyze whether previously obtained intersection entry line information is identical to intersection entry line information on a map.

For example, when the intersection entry line is one among five lines on the map, because of the number of intersection entry lines obtained as a result of performing the line analysis is two, the intersection entry lines are not identical to each other.

Thus, when the intersection entry line information obtained as a result of performing the line analysis is not identical to the intersection entry line information on the map, the controller 110 may determine a map update.

When the intersection entry line information obtained as a result of performing the line analysis is not identical to the intersection entry line information on the map, the controller 110 may determine whether to update the map based on a result of determining reliability of line information from a reliability determining device 180 of FIG. 1.

Thus, the reliability determining device 180 may determine whether the line information obtained as a result of performing the line analysis in the line analyzing device 170 is reliable information.

Herein, the reliability determining device 180 may obtain traffic congestion information based on density of surrounding vehicles. The density of the surrounding vehicles may be determined based on pieces of information of the surrounding vehicles, which are detected by the sensor device 130.

In this case, the reliability determining device 180 may determine reliability of the line information based on the obtained traffic congestion information.

Meanwhile, because there are very few surrounding vehicles around the vehicle, when not identifying density of the surrounding vehicles, the reliability determining device 180 may collect traffic situation information at a corresponding time and may determine reliability of line information based on the traffic situation information.

Herein, the reliability determining device 180 may calculate the reliability in the form of a score and may determine that the line information is reliable, when the calculated reliability score is greater than or equal to a reference score. Herein, it is only one embodiment, and it is obvious that the criterion of determining the reliability is applicable in various manners.

Thus, when it is determined that the line information obtained as a result of performing the line analysis from the line analyzing device 170 is not identical to the line information on the map and when it is determined that reliability of the obtained line information is greater than or equal to the criterion, the controller 110 may determine a map update.

When the map update is determined, the controller 110 may extract a change point based on a point where the pieces of line information are not identical to each other on the map. In this case, the controller 110 may extract a change point based on coordinates of the map.

The controller 110 may update line information of the map based on the extracted change point on the map.

The updated line information may be reflected when a navigation system calls map data.

Figure 4A:
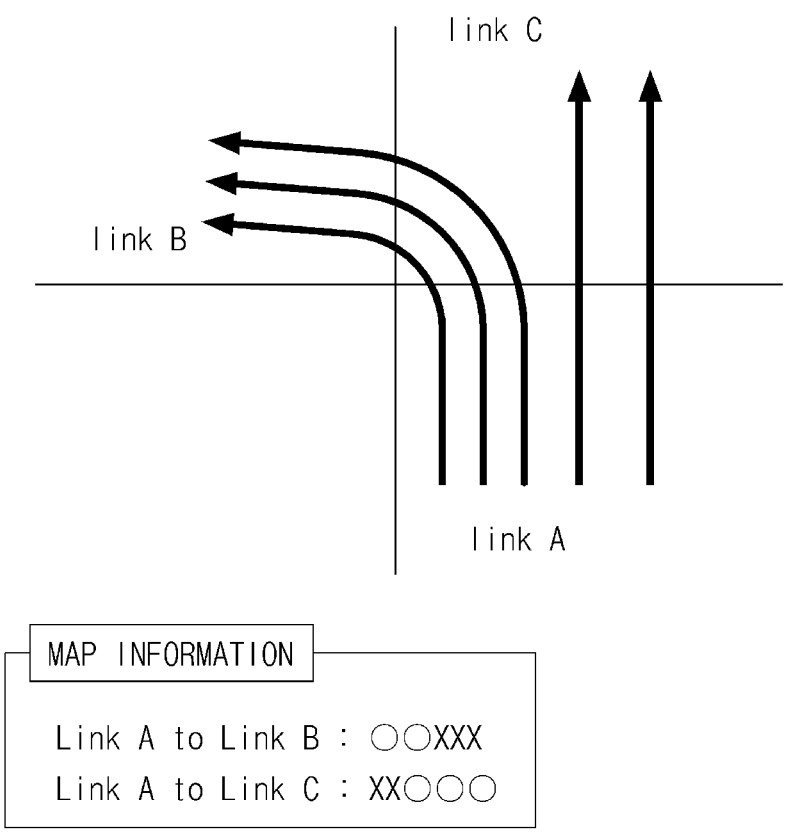
FIGS. 4A and 4B are drawings illustrating an embodiment referenced to describe an operation of analyzing a line in an apparatus for updating map information according to an embodiment of the present disclosure.
Figure 4B:
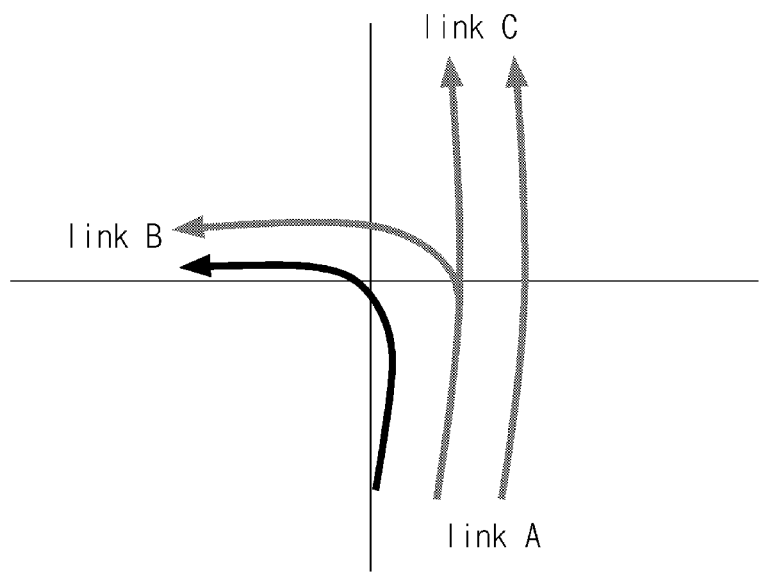

FIGS. 4A and 4B are drawings illustrating an embodiment referenced to describe an operation of analyzing a line in an apparatus for updating map information according to an embodiment of the present disclosure.

First of all, FIG. 4A illustrates line movement based on a link on a general road.

In FIG. 4A, the current position of the vehicle is link A, a left section the vehicle enters through an intersection from link A is link B, and a forward section the vehicle enters straight from link A is link C.

Referring to FIG. 4A, line information where it is possible for the vehicle to enter link B from link A on the map is "Link A to Link B: OOXXX", and line information where it is possible for the vehicle to enter link C from link A is "Link A to Link C: XXOOO".

In other words, the line where it is possible for the vehicle to enter link B from link A is lane 1 or lane 2, and the line where it is possible for the vehicle to enter link C from link A is lane 3, lane 4, or lane 5.

In this case, when it is determined that the intersection entry line is lane 1, lane 2, or lane 3 by line analysis like an arrow of FIG. 4A, line information where it is possible for the vehicle enters the intersection is not identical to line information on the map.

Thus, a controller 110 of FIG. 1 may update map information using the information of the intersection entry line obtained by the line analysis.

In this case, the controller 110 may reflect the line information obtained when the vehicle is traveling in the map in real time.

Meanwhile, FIG. 4B illustrates line movement based on a link on the road including lines where it is possible for the vehicle to travels straight and make a left turn at the same time.

In FIG. 4B, the current position of the vehicle is link A, a left section the vehicle enters through an intersection from link A is link B, and a forward section the vehicle enters straight from link A is link C.

Referring to FIG. 4B, line information where it is possible for the vehicle to enter link B from link A on the map is "Link A to Link B: OOX", and line information where it is possible for the vehicle to enter link C from link A is "Link A to Link C: XOO".

In other words, the line where it is possible for the vehicle to enter link B from link A is lane 1 or lane 2, and the line where it is possible for the vehicle to enter link C from link A is lane 2 or lane 3.

It is possible for the vehicle to enter only link B on lane 1 and it is possible for the vehicle to enter only link C on lane 3. However, it is possible for the vehicle to enter both link B and link C on lane 2.

In this case, when the vehicle travels through an intersection on lane 1 and when a surrounding vehicle located on lane 2 travels straight, a line analyzing device 170 of FIG. 1 may detect lane 2 as a straight line.

Meanwhile, when the vehicle travels through an intersection on lane 1 and when a surrounding vehicle located on lane 2 travels through the intersection together with the vehicle, the line analyzing device 170 may detect lane 2 as an intersection entry line.

In this case, because it is possible for the vehicle to travel through the intersection and travel straight on lane 2, a flow of traffic information with a general intersection entry line or a straight line, for example, an average speed may vary.

Thus, a reliability determining device 180 of FIG. 1 may determine reliability of the result of analyzing the line, based on the surrounding information and the traffic congestion information collected by a sensor device 130 of FIG. 1 and the flow of the traffic information on the detected line.

Thus, a controller 110 of FIG. 1 may determine to reflect the information obtained as a result of performing the line analysis based on the result of determining the reliability in updating map information.

As described above, the apparatus for updating the map information according to an embodiment of the present disclosure may reflect a line change situation in map data in real time, when a line situation of the intersection is temporarily changed due to road construction or the like or when a line is changed due to road improvement, a structure change, or the like. In this case, as the driver drives the vehicle through the intersection based on the map data in which the line change situation is reflected in real time, convenience may be increased.

The apparatus for updating the map information according to an embodiment of the present disclosure may be implemented in the vehicle. In this case, the apparatus for updating the map information may be integrally configured with control units in the vehicle or may be implemented as a separate device to be connected with the control units of the vehicle.

The apparatus for updating the map information according to an embodiment of the present disclosure, which performs the above-mentioned operations, may be implemented in the form of an independent hardware device including a memory and a processor for processing each operation or may be driven in the form of being included in another hardware device such as a microprocessor or a universal computer system.

A description will be given in detail of operational flow of the apparatus for updating the map information according to an embodiment of the present disclosure, having the above-mentioned configuration.

Figure 5:
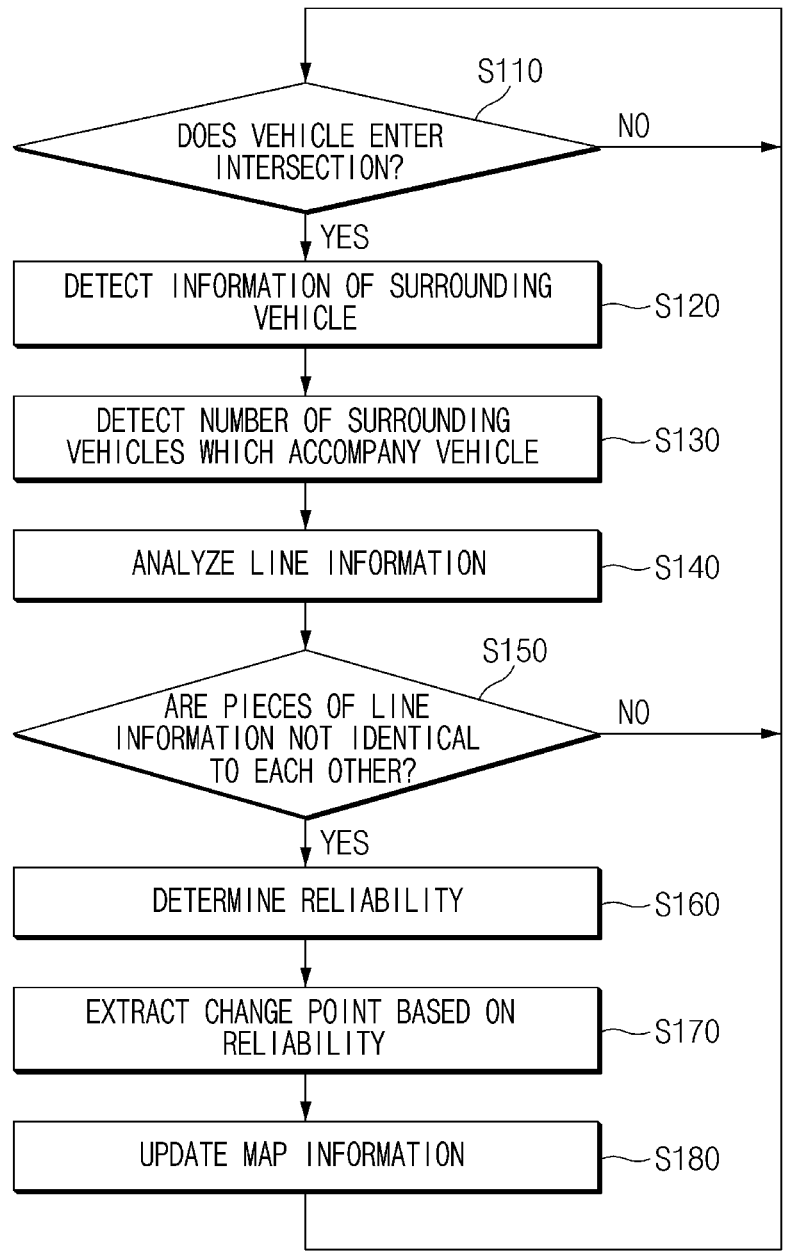
FIG. 5 is a drawing illustrating operational flow of a method for updating map information according to an embodiment of the present disclosure.

FIG. 5 is a drawing illustrating operational flow of a method for updating map information according to an embodiment of the present disclosure.

Referring to FIG. 5, when the vehicle enters an intersection in S110, in S120, an apparatus for updating map information may detect information of a surrounding vehicle by at least one sensor provided in the vehicle. In this case, the apparatus for updating the map information may detect the information of the surrounding vehicle using a sensor which operates based on an advanced driver assistance system (ADAS), for example, a camera.

In S130, the apparatus for updating the map information may detect the number of surrounding vehicles which accompany the vehicle among surrounding vehicles recognized by the information of the surrounding vehicles detected in S120 when the vehicle travels through the intersection.

In this case, in S140, the apparatus for updating the map information may analyze line information based on the number of the surrounding vehicles detected in S130.

The apparatus for updating the map information may obtain the number of intersection entry lines as a result of analyzing the line information in S140.

The apparatus for updating the map information may determine whether the line information obtained as a result of analyzing the line information in S140 is identical to map information. When the line information obtained in S140 is not identical to the map information in S150, in S160, the apparatus for updating the map information may determine reliability of the line information obtained in S140. In S170, the apparatus for updating the map information may extract a change point on a map based on the reliability.

In this case, the apparatus for updating the map information may determine to update the map, when the reliability of the line information is greater than or equal to a reference value and may extract a change point on the map.

The apparatus for updating the map information may update map information based on the change point extracted in S170. In this case, the apparatus for updating the map information may update the map information based on the line information obtained as a result of performing the line analysis in S140.

Figure 6:
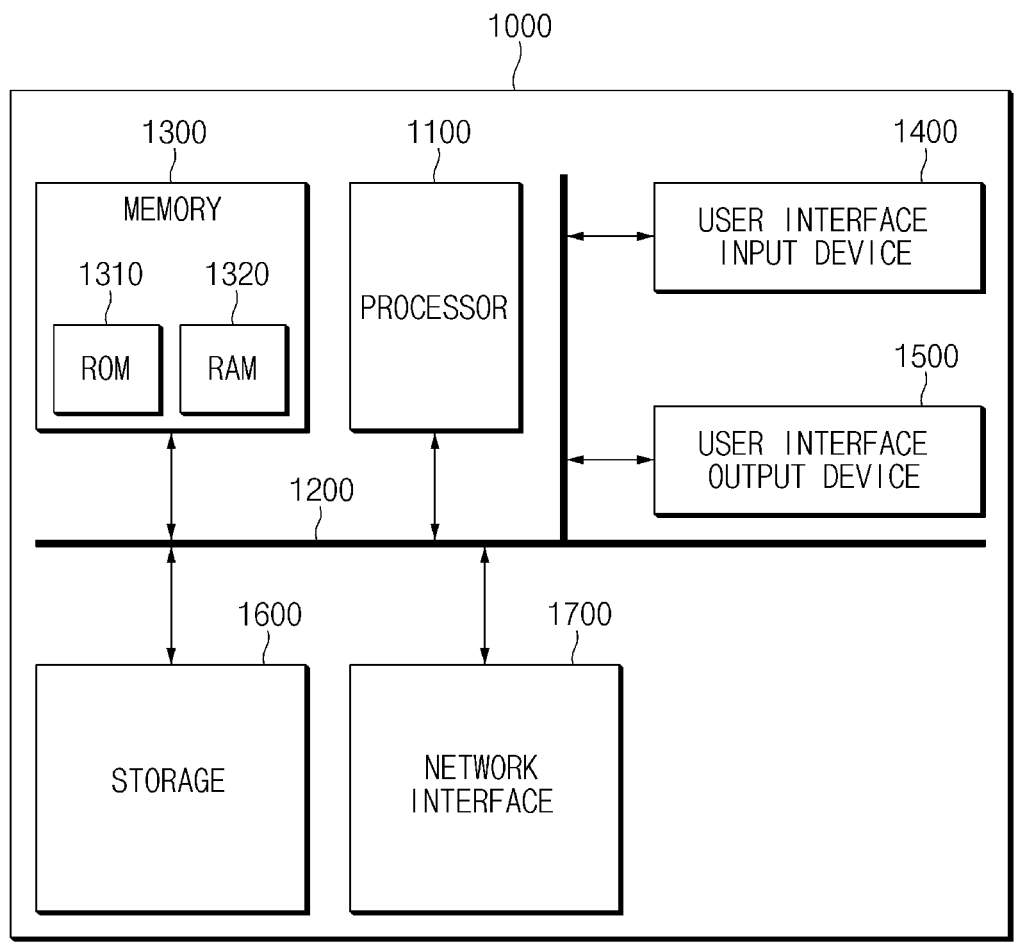
FIG. 6 is a block diagram illustrating a computing system for executing the method according to an embodiment of the present disclosure.

FIG. 6 is a block diagram illustrating a computing system for executing the method according to an embodiment of the present disclosure.

Referring to FIG. 6, a computing system 1000 may include at least one processor 1100, a memory 1300, a user interface input device 1400, a user interface output device 1500, storage 1600, and a network interface 1700, which are connected with each other via a bus 1200.

The processor 1100 may be a central processing unit (CPU) or a semiconductor device that processes instructions stored in the memory 1300 and/or the storage 1600. The memory 1300 and the storage 1600 may include various types of volatile or non-volatile storage media. For example, the memory 1300 may include a read only memory (ROM) 1310 and a random access memory (RAM) 1320.

Thus, the operations of the method or the algorithm described in connection with the embodiments disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, and a CD-ROM. The exemplary storage medium may be coupled to the processor, and the processor may read information out of the storage medium and may record information in the storage medium. Alternatively, the storage medium may be integrated with the processor 1100. The processor and the storage medium may reside in an application specific integrated circuit (ASIC). The ASIC may reside within a user terminal. In another case, the processor and the storage medium may reside in the user terminal as separate components.

According to embodiments of the present disclosure, the apparatus for updating the map information may extract a change point of a map based on driving information collected from a general vehicle or an autonomous vehicle and may update line information of the map, thus providing an accurate map and updating map information at low cost without using a high-priced mobile mapping system (MMS).

Furthermore, according to embodiments of the present disclosure, the apparatus for updating the map information may reflect changes of the intersection entry line in map information in real time, thus increasing convenience of the driver.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary embodiments of the present disclosure are provided to explain the spirit and scope of the present disclosure, but not to limit them, so that the spirit and scope of the present disclosure is not limited by the embodiments. The scope of the present disclosure should be construed based on the accompanying claims, and all the technical ideas within the scope equivalent to the claims should be included in the scope of the present disclosure.

What is claimed is:

1. An apparatus for updating map information for a vehicle, the apparatus comprising:
   a memory configured to store program instructions; and
   one or more processors configured to execute the program instructions;
   wherein the program instructions, when executed, are configured to:
   detect information of a surrounding vehicle which accompanies the vehicle, when the vehicle travels through an intersection;
   analyze line information based on the information of the surrounding vehicle which accompanies the vehicle;
   determine reliability of the line information; and
   extract a change point on a map based on the reliability and update the map information based on the change point, and
   obtain an intersection entry line information based on the number of surrounding vehicles traveling in the intersection in the same direction as the vehicle among vehicles located on the left or right side of the vehicle.

2. The apparatus of claim 1, wherein the one or more processors are configured to collect the information of the surrounding vehicle recognized from at least one sensor provided in the vehicle, when the vehicle enters the intersection.

3. The apparatus of claim 2, wherein the information of the surrounding vehicle includes ID information of the surrounding vehicle recognized by a camera of the vehicle.

4. The apparatus of claim 2, wherein the one or more processors are configured to detect the information of the surrounding vehicle which accompanies the vehicle among the collected information of the surrounding vehicle, when the vehicle travels through the intersection.

5. The apparatus of claim 1, wherein the one or more processors are configured to match the vehicle on the map based on position information of the vehicle and identifies an intersection entry or driving state based on information of the vehicle matched on the map.

6. The apparatus of claim 1, wherein the one or more processors are configured to analyze whether the obtained intersection entry line information is identical to intersection entry line information on the map.

7. The apparatus of claim 6, wherein the one or more processors are configured to extract the change point based on a point where the obtained intersection entry line information and the intersection entry line information on the map are not identical to each other on the map, when the obtained intersection entry line information is not identical to the intersection entry line information on the map.

8. The apparatus of claim 7, wherein the one or more processors are configured to update line information about the change point of the map, based on the obtained intersection entry line information.

9. The apparatus of claim 1, wherein the one or more processors are configured to obtain traffic congestion information based on a density of the surrounding vehicle and determines the reliability of the line information based on the traffic congestion information.

10. A method for updating map information for a vehicle using a memory configured to store program instructions and one or more processors configure to execute the program instructions, the method comprising:
    detecting information of a surrounding vehicle which accompanies the vehicle, when the vehicle travels through an intersection;
    analyzing line information based on the information of the surrounding vehicle which accompanies the vehicle;
    determining reliability of the line information; and
    extracting a change point on a map based on the reliability and updating map information based on the change point, and
    wherein analyzing the line information includes obtaining intersection entry line information based on the number of surrounding vehicles traveling in the intersection in the same direction as the vehicle among vehicles located on the left/right side of the vehicle.

11. The method of claim 10, wherein detecting the information of the surrounding vehicle includes:
    collecting the information of the surrounding vehicle recognized from at least one sensor provided in the vehicle, when the vehicle enters the intersection.

12. The method of claim 11, wherein the information of the surrounding vehicle includes ID information of the surrounding vehicle recognized by a camera of the vehicle.

13. The method of claim 11, wherein detecting the information of the surrounding vehicle further includes:
    detecting the information of the surrounding vehicle which accompanies the vehicle among the collected information of the surrounding vehicle, when the vehicle travels through the intersection.

14. The method of claim 10, wherein detecting the information of the surrounding vehicle includes:
    matching the vehicle on the map based on position information collected from the vehicle and identifying an intersection entry or driving state based on information of the map on which the vehicle is matched.

15. The method of claim 10, wherein analyzing the line information further includes:
    analyzing whether the obtained intersection entry line information is identical to intersection entry line information on the map.

16. The method of claim 15, wherein updating the map information includes:
    extracting the change point based on a point where the obtained intersection entry line information and the intersection entry line information on the map are not identical to each other on the map, when the obtained intersection entry line information is not identical to the intersection entry line information on the map.

17. The method of claim 16, wherein updating the map information further includes:
   updating line information about the change point of the map, based on the obtained intersection entry line information.

18. The method of claim 10, wherein determining the reliability includes:
   obtaining traffic congestion information based on a density of the surrounding vehicle and determining the reliability of the line information based on the traffic congestion information.

* * * * *